UNITED STATES PATENT OFFICE.

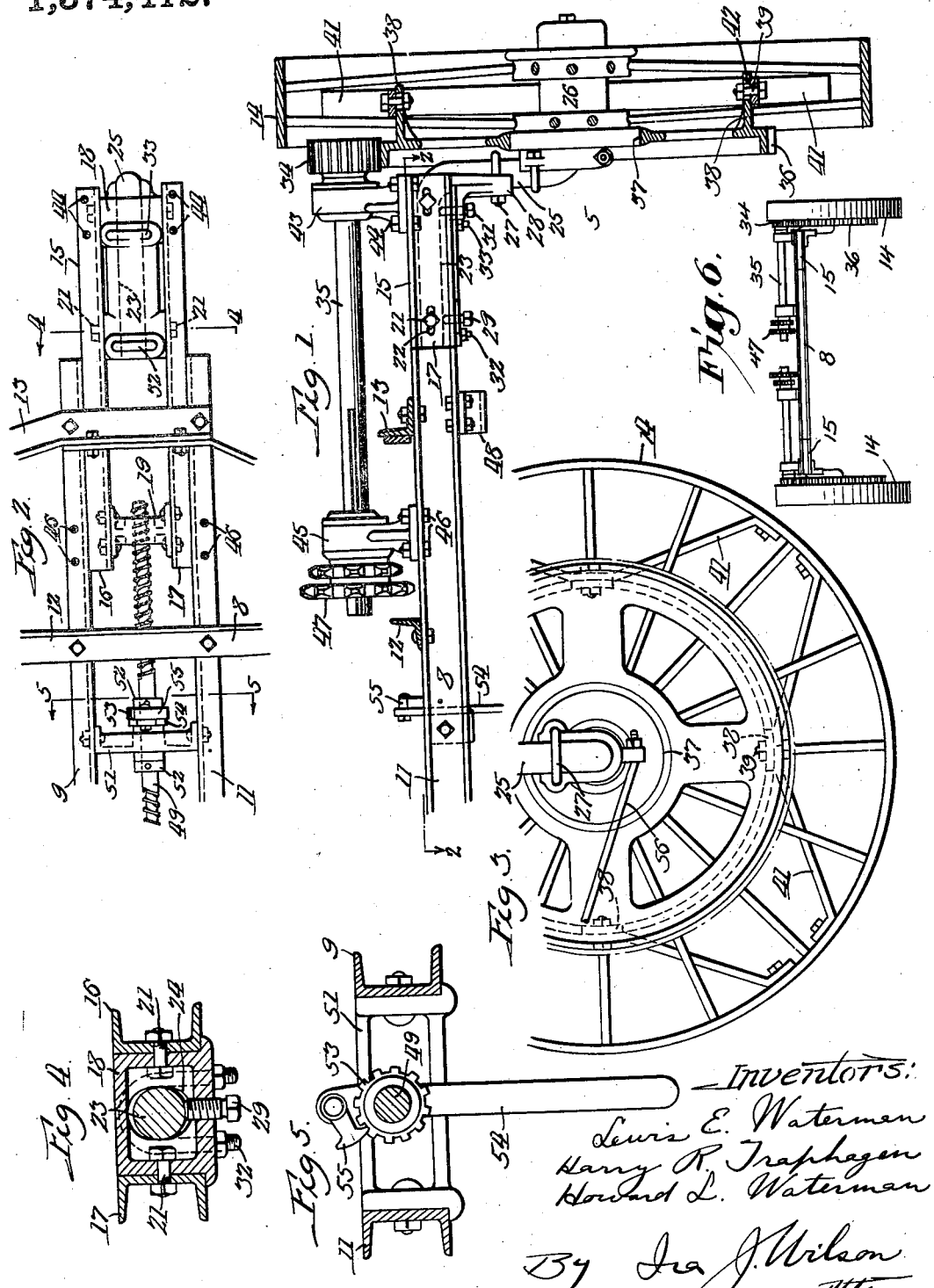

LEWIS E. WATERMAN, HARRY R. TRAPHAGEN, AND HOWARD L. WATERMAN, OF ROCKFORD, ILLINOIS, ASSIGNORS TO EMERSON-BRANTINGHAM COMPANY, OF ROCKFORD, ILLINOIS, A CORPORATION OF ILLINOIS.

RUNNING-GEAR FOR MOTOR-VEHICLES.

1,374,412.   Specification of Letters Patent.   Patented Apr. 12, 1921.

Original application filed June 9, 1919, Serial No. 302,695. Divided and this application filed June 9, 1919. Serial No. 302,697.

*To all whom it may concern:*

Be it known that we, LEWIS E. WATERMAN, HARRY R. TRAPHAGEN, and HOWARD L. WATERMAN, citizens of the United States, residing at Rockford, in the county of Winnebago and State of Illinois, have invented certain new and useful Improvements in Running - Gears for Motor - Vehicles, of which the following is a specification.

This invention relates to running gear and parts appurtenant thereto for motor vehicles, and has particular reference to that class of motor vehicles known as farm tractors. The subject matter of the present invention is especially adapted for embodiment in a farm tractor in the manner shown and described in our copending application, Serial No. 302,695, of which the present application is a division.

The principal object of the present invention is to provide a generally improved running gear of the character mentioned, with the view to obtaining a strong, durable and thoroughly practical construction embodying various features of adjustment, which are advantageous and desirable not only to the manufacturer as factors enabling economical production, but also to the user in adapting the tractor to different working conditions and in adjusting parts to be taken up for wear after long usage.

To this end, and among the objects of our invention, we have aimed to provide improved means for attaching the traction wheels to a frame and for obtaining various adjustments of the wheels relatively to the frame, to provide improved immediate driving means for the traction wheels, which means coöperate with each traction wheel and its running gear so as to constitute a unit adjustable laterally on the main frame to accommodate the tractor to various working conditions, and to provide novel means for adjusting said units outwardly and inwardly on the main frame.

Other objects and attendant advantages will be appreciated as the invention becomes better understood by reference to the following description when considered in connection with the accompanying drawings, in which—

Figure 1 is a vertical sectional view through a traction wheel and running gear for a motor vehicle embodying our improvements;

Fig. 2, a plan sectional view taken substantially on the line 2—2 of Fig. 1;

Fig. 3, a fragmentary view of the traction wheel looking at the inner side thereof;

Figs. 4 and 5, detail sectional views taken substantially on the lines 4—4 and 5—5 of Fig. 2; and Fig. 6 is a diagrammatic view on a reduced scale showing a rear elevation of a pair of traction wheels arranged according to the present invention.

As already mentioned, the present improvements are especially adapted for a farm tractor in the manner shown in our copending application. This tractor has a pair of traction wheels each connected with the main frame and driven in the same manner, hence we have deemed it necessary in the present case to illustrate in detail but a single traction wheel, its running gear and immediate drive means, it being understood that these parts are duplicated on the opposite side of the tractor.

The main frame of the motor vehicle designated generally by character 8, may be of any suitable construction and as shown, includes, preferably, a pair of transversely extending front and rear channel beams 9 and 11 respectively, rigidly joined together by fore-and-aft frame angle bars 12 and 13 or the equivalent, the longitudinal center-line of the vehicle being designated by the letter A in Fig. 2. In the particular farm tractor in which the present improvements are embodied, the frame bars 12 and 13 at each side of the centerline extend forwardly, providing a frame upon which a motor and transmission mechanism are mounted and which is supported at its forward end by a single dirigible wheel.

The traction wheel designated generally by character 14 is connected to the main frame through the agency of a frame section designated generally by character 15, which is adjustable laterally upon and with respect to the main frame for varying the distance between the traction wheels. In this particular case, the main frame is supported relatively high so as to be adapted for cultivating purposes and the traction wheels are adjustable laterally to accommodate different widths of rows. The adjustable frame section 15 in its preferred embodiment consists of a pair of front and rear channel beams 16 and 17 respectively interposed between the channel beams 9 and 11 rigidly secured together in spaced relation at their outer and inner ends by an interposed axle bracket 18 and a screw shaft bracket 19. As shown in Figs. 1 and 4, the channel beams 16 and 17 are rigidly secured to the bracket 18 by means of bolts 21 which pass through elongated openings 22 in the web of the channel beams, thus permitting of horizontal adjustment of the bracket 18 relatively to the frame section 16. The bracket 18 is shaped to receive the horizontal portion 23 of an axle member and is preferably cored longitudinally for this purpose to provide a bore 24 slightly elongated in cross section, as shown in Fig. 4, for the purpose of permitting vertical adjustment or play of said axle portion within the bore. The axle member has an upright portion 25 joining the horizontal portion 23 with the axle proper upon which the hub 26 of the traction wheel revolves. The upright portion 25 of the axle member is clamped by means of a U-bolt 27 to a depending extension 28 integral with the bracket 18. Adjustable means are now provided for securing the horizontal portion 23 of the axle member to the bracket 18, consisting preferably of a pair of set screws 29 and 31 and U-bolts 32 and 33. The set screws are arranged as shown in Fig. 1 adjacent to the outer and inner ends of the bracket 18 and are threaded through the lower wall thereof as shown in Fig. 4, and form vertically adjustable seats for the axle portion 23. The U-bolts 32 and 33 arranged adjacent to the set screws 29 and 31 respectively and embracing the top of the axle portion 23 and passing down through the bottom of the bracket 18, are equipped with the usual nuts for drawing the bolts tight to clamp the axle member in fixed position on the set screws. It will be obvious that by adjustment of these set screws and the U-bolts the position of the axle portion 23 with respect to the horizontal may be varied, thereby canting the traction wheel with respect to the vertical for the purpose of properly alining the driving connection for the traction wheel as mentioned hereinafter.

The immediate means for driving the traction wheel is associated with the running gear and traction wheel in the following manner: Our invention contemplates the provision of a cross shaft so mounted in connection with the adjustable frame section 15 and having such driving connection with the traction wheel that the cross shaft, the frame section and traction wheel constitute a unit adapted to be adjusted laterally on the main frame. In the present illustration of our improvements, this driving connection is by direct engagement of a spur gear 34 on the cross shaft 35 with a bull gear 36 fixed to the traction wheel. The bull gear fits on the hub of the traction wheel at 37 and is provided with laterally extending lugs 38 which are secured by bolts 39 to the struts 41 in turn fixed to the rim of the traction wheel. By slotting the lugs at 42 sufficient play is allowed to true the gear with relation to the traction wheel when assembling. The cross shaft 35 has a bearing at its outer end in the bearing bracket 43 which is secured by means of bolts 44 to the outer end of the adjustable frame section, as shown in Figs. 1 and 2. The inner end of the cross shaft is journaled in a bearing bracket 45 secured by bolts 46 to the channel beams 9 and 11 on the main frame. The cross shaft is driven through any suitable means, such for example as a sprocket 47, splined on the shaft. Inasmuch as the cross shaft is held against axial lateral movement with respect to the bearing bracket 43 the relation between the gears 34 and 36 is not changed when the frame section 15 is adjusted laterally. It will be manifest that when such an adjustment is made, the sprocket 47 will first be loosened so as not to interfere with the bearing bracket 45 when adjusting the frame outwardly. The frame section 15 during movement inwardly and outwardly on the main frame is guided at its sides between the channel beams 9 and 11, at its top by the frame bar 13 and the base of the bearing bracket 45, and at its bottom by a guide plate 48 fixed to the channels 9 and 11. The cross shaft 35 by being mounted at its outer end in a bracket fixed to the adjustable frame section and at its inner end in a bearing bracket fixed to the main frame, also functions as a guide between the adjustable frame section and the main frame. In order to resist the backward thrust against the lower end of the depending axle support a radius rod 56 is attached to a bracket 57 on the axle member and connects to a forward portion of the main frame, not shown.

Means is now provided for positively moving the traction wheel frame sections at each end of the main frame inwardly and outwardly in unison and for locking them in any adjusted position. This means consists preferably of a single screw shaft 48 passing through a bracket 51 fixed to the channel beams 9 and 11 and held against longitudinal axial movement with respect to the bracket 51 by suitable collars 52. This screw shaft is provided at one end with a left hand screw and at its opposite end with a right hand screw, and these are threadingly engaged respectively with the brackets 19 at the inner ends of the adjustable frame sections. By revolving the screw shaft 49, the frame sections 15 will be simultaneously moved inwardly and outwardly according to the direction in which said shaft is rotated. As shown in Fig. 5, the screw shaft 49 is equipped with a fixed ratchet wheel 53 and also a loose hand lever 54 which is provided with a pawl 55 coöperating with the ratchet wheel. By oscillating the lever 54, the screw shaft 49 will be rotated in one direction by means of the ratchet connection and by swinging the pawl to the opposite side from that shown in Fig. 5 the screw shaft will be revolved in the opposite direction. This ratchet and screw device provides a very effective and practical means for adjusting the frame sections in unison and also serves to lock these frame sections in any position to which they have been moved.

From the foregoing, it will be manifest that we have provided a running gear and immediate drive for a traction wheel constituting a unit adjustable upon a main frame to vary the width of tread, that the coöperating parts are so designed as to give a thoroughly practical, strong and durable construction well adapted for the severe strains to which the parts are subjected in use, and that ample provision is made for adjusting the parts when assembling to secure the proper coöperation of related parts and especially proper alinement and mesh of the gears 34 and 36 by adjustment of set screws 29 and 31 and the U-bolts 32 and 33.

It is believed that the foregoing conveys a clear understanding of the objects prefaced above, and while we have illustrated and described but a single working embodiment of our invention it should be understood that various changes might be made in the construction and arrangement without departing from the spirit and scope of the invention as expressed in the appended claims.

We claim:

1. In a motor vehicle, the combination of a frame including a pair of transverse beams at each side thereof, an axle bracket interposed between and bolted to the beams of each pair at the outer end thereof, a pair of traction wheels, an axle for each traction wheel having a horizontal portion mounted on one of said brackets, and adjusting means operative between the bracket and said axle portions for adjusting the latter to change the position of its respective traction wheel relative to the frame.

2. In a motor vehicle, the combination of a frame including a pair of transverse beams spaced apart, a bracket interposed between and fixed to said beams and having a laterally extending bore, an axle member having an axle portion, an upright portion and an upper horizontal portion the latter of which extends into said bore, a traction wheel mounted on said axle portion, a pair of laterally spaced set screws through a wall of said bracket and abutting against said upper horizontal axle portion, and a U-bolt embracing said axle portion and clamping the same rigidly to said set screws.

3. In a motor vehicle, the combination of a frame, a traction wheel, an axle member therefor having a horizontal axle portion, an upright portion and an upper horizontal portion, a pair of set screws spaced laterally on the frame and upon which said upper horizontal portion of the axle member rests, and one or more U-bolts embracing the upper horizontal portion of the axle member for rigidly holding the latter in connection with said set screws, said set screws and U-bolts being adjustable for tilting the axle member and consequently the traction wheel relatively to the frame.

4. In a motor vehicle, the combination of a frame including a pair of rigid transversely extending beams, a separate pair of beams interposed between said rigid beams at each end thereof and rigidly united together each constituting a laterally adjustable frame section, a traction wheel mounted on the outer end of each adjustable frame section, a transverse cross shaft at each side of the vehicle journaled at its outer end on a bearing carried by the adjustable pair of beams and at its inner end on a bearing carried by the rigid pair of beams, a pinion fixed to the outer end of each cross shaft, a bull gear fixed to each traction wheel and meshing with the adjacent pinion, means for driving each cross shaft, and means permitting said frame sections to be adjusted laterally upon and with respect to the rigid beams.

5. In a motor vehicle, the combination of a frame including a pair of rigid transversely extending beams, a separate pair of beams interposed between said rigid beams at each end thereof and rigidly united together constituting a laterally adjustable frame section, a traction wheel mounted on the outer end of each adjustable frame section, a transverse cross shaft at each side of the vehicle journaled at its outer end on a bearing carried by the adjustable pair of beams and at its inner end on a bearing carried by the rigid pair of beams, a driving connection between each cross shaft and the adjacent traction wheel, means for separately driving the cross shafts, a screw-threaded member held against longitudinal movement with respect to the rigid beams and threadingly engaged at each end with threaded members fixed to the adjustable frame sections, the thread at the opposite ends of said threaded member being right and left hand respectively, and means for rotating said threaded member whereby to adjust the frame sections inwardly or outwardly in unison.

6. In a motor vehicle, the combination of a main frame, a frame section at each side thereof adjustable laterally thereon, a traction wheel mounted in connection with each frame section, a single laterally extending screw shaft held in connection with the main frame against lateral movement thereon, the crew shaft having right hand threads at one end and left hand threads at the opposite end and being threadingly engaged at each end with the adjacent frame section, and means for rotating said screw shaft to adjust the frame sections and traction wheels inwardly and outwardly.

7. In a motor vehicle, the combination of a main frame, a pair of traction wheels, a frame section intermediate each traction wheel and the main frame and adjustable transversely on the latter, a single screw shaft interposed between and threadingly engaged at its ends with said adjustable frame sections, and means for revolving said screw shaft for simultaneously adjusting said frame sections and traction wheels inwardly and outwardly.

8. In a motor vehicle, the combination of a main frame, a pair of traction wheels mounted on the main frame for adjustment laterally thereon, a screw shaft held intermediate its ends in connection with the main frame against lateral movement relatively thereto and having right and left hand threads on its opposite ends threadingly engaged respectively in connection with the adjacent traction wheel, a toothed ratchet wheel fixed to the screw shaft, a lever carrying a pawl adapted to engage with said ratchet wheel and to rotate the same by oscillation of the lever for simultaneously moving the traction wheels inwardly and outwardly with respect to the frame.

9. In a motor vehicle, the combination of a main frame, a frame section at each side thereof adjustable laterally thereon, a traction wheel in connection with each frame section and equipped with a bull gear, a cross shaft for driving each traction wheel, a pinion on each cross shaft meshing with its respective traction wheel bull gear, means for adjusting the frame sections laterally on the main frame, and means for causing each cross shaft and pinion to move as a unit with its respective frame section when adjusting the same laterally.

10. In a motor vehicle, the combination of a main frame including a pair of transverse channel beams spaced apart, a pair of channel beams at each side of the frame rigidly secured together and interposed between said channel beams of the main frame and adjustable laterally between the same, a traction wheel mounted in connection with each adjustable channel beam section and equipped with a bull gear, a cross shaft for driving each traction wheel and equipped with a pinion meshing with the gear of its respective traction wheel, each cross shaft having a bearing adjacent to its pinion and fixed to the adjustable pair of channel beams and having another bearing spaced inwardly from the first mentioned and fixed to the channel beams of the main frame, and means for adjusting the channel beam sections and their cross shafts respectively inwardly and outwardly relatively to the main frame.

11. In a motor vehicle, the combination of a main frame, a traction wheel equipped with a bull gear, a frame section supported by the traction wheel and connecting the latter with the main frame so that the traction wheel may be adjusted inwardly and outwardly on said main frame, a cross shaft equipped with a pinion for driving said bull gear, and bearings for the cross shaft fixed respectively to the main frame and the adjustable frame section, said frame section and its cross shaft being adjustable as a unit inwardly and outwardly upon the main frame.

12. In a motor vehicle, the combination of a frame, a traction wheel equipped with a bull gear, an axle member for the traction wheel having a horizontal portion mounted on the frame, a cross shaft on the frame having a pinion meshing with said bull gear, a pair of laterally spaced set screws on the frame and in connection with said horizontal portion of the axle member, and means for clamping said horizontal axle portion rigidly in connection with said set screws, said set screws and clamping means being adjustable to obtain the proper mesh between said pinion and bull gear.

13. In a motor vehicle, the combination of a main frame and a laterally adjustable frame section mounted upon one side thereof and through means of which a traction wheel is connected with the frame, a traction wheel equipped with a bull gear, a cross shaft having a pinion for driving said bull gear and being mounted upon and in permanent relation with the adjustable frame section, an axle member for the bull gear having a horizontal portion adapted for mounting on said frame section, the frame section including a bracket for the reception of said horizontal portion of the axle, and adjusting devices for adjusting the axle portion relatively to the bracket for securing the proper operating relation between said pinion and bull gear and the bracket relatively to said frame section proper.

14. In a motor vehicle, the combination of a main frame, a frame section at one side thereof adjustable laterally thereon, a traction wheel mounted in connection with said adjustable frame section and equipped with a bull gear, a cross shaft having a pinion for driving said bull gear, bearings for the cross shaft rigidly secured to the main frame and the adjustable frame section respectively, means for adjusting said frame section laterally on the main frame, and means for causing the cross shaft to move with said frame section when it is adjusted laterally.

LEWIS E. WATERMAN.
HARRY R. TRAPHAGEN.
HOWARD L. WATERMAN.